(12) United States Patent
Halloush et al.

(10) Patent No.: US 7,423,943 B2
(45) Date of Patent: Sep. 9, 2008

(54) METHOD AND SYSTEM FOR SETTING OPTICAL DRIVE WRITE SPEED

(75) Inventors: Munif Farhan Halloush, Round Rock, TX (US); Christiaan Steenbergen, Austin, TX (US); Steve Kutz, Austin, TX (US)

(73) Assignee: Dell Products L.P., Round Rock, TX (US)

(*) Notice: Subject to any disclaimer, the term of this patent is extended or adjusted under 35 U.S.C. 154(b) by 543 days.

(21) Appl. No.: 10/688,237

(22) Filed: Oct. 18, 2003

(65) Prior Publication Data

US 2005/0083811 A1      Apr. 21, 2005

(51) Int. Cl.
   *G11B 15/52* (2006.01)
(52) U.S. Cl. .................... 369/47.49; 369/47.55
(58) Field of Classification Search .......... None
   See application file for complete search history.

(56) References Cited

U.S. PATENT DOCUMENTS

| | | | |
|---|---|---|---|
| 5,502,702 A | 3/1996 | Nakajo | 369/58 |
| 6,154,437 A | 11/2000 | Utsunomiya et al. | 369/275.2 |
| 6,381,202 B1* | 4/2002 | Shimoda | 369/47.1 |
| 6,407,976 B2 | 6/2002 | Nagara et al. | 369/116 |
| 6,445,669 B1 | 9/2002 | Hattori et al. | 369/116 |
| 6,469,968 B1 | 10/2002 | Van Den Enden et al. | 369/59.12 |
| 6,912,188 B2* | 6/2005 | Morishima | 369/47.53 |
| 6,915,374 B2* | 7/2005 | Pereira | 711/5 |
| 7,173,891 B2* | 2/2007 | Lee et al. | 369/47.27 |
| 2002/0105874 A1* | 8/2002 | Matsumoto | 369/47.53 |
| 2003/0021201 A1 | 1/2003 | Kobayashi | 369/47.39 |
| 2003/0058765 A1 | 3/2003 | Schreurs et al. | 369/47.53 |
| 2004/0160873 A1* | 8/2004 | Pereira | 369/47.53 |

FOREIGN PATENT DOCUMENTS

| | | |
|---|---|---|
| KR | 2002096641 | 12/2002 |
| KR | 2003069706 | 8/2003 |
| WO | WO 03/030153 A2 | 10/2003 |
| WO | WO 03/030153 A3 | 10/2003 |

OTHER PUBLICATIONS

U.S. Appl. No. 10/361,284 entitled "Method and System for Time Compensation of Re-Writable Optical Media Write Parameters" naming Christiann Steenbergen as inventor and filed February 10, 2003.

(Continued)

*Primary Examiner*—Joseph Feild
*Assistant Examiner*—Tawfik Goma
(74) *Attorney, Agent, or Firm*—Hamilton & Terrile, LLP; Robert W. Holland

(57) ABSTRACT

Optical medium identification codes, such as the ATIP start codes used for CD-R optical media, are preassigned by optical medium manufacturer for association with planned optical media of the manufacturer. Optical disc drive manufacturers build optical disc drives having the preassigned optical medium identification codes in write strategy tables even though the optical disc drives are manufactured and sold before release and development of write strategies for the planned optical media. General write strategies associated with the preassigned optical medium identification codes provide more rapid write speeds for optical media having preassigned codes than for optical media having unknown identification codes by basing the preassigned write strategies on planned optical media design parameters, such as similarities with existing optical media of the manufacturer.

20 Claims, 2 Drawing Sheets

OTHER PUBLICATIONS

U.S. Appl. No. 10/376,807 entitled "Method and System for Reconditioning Optical Storage Media to Write Updated Information" naming Dean Hendrickson, Hong-Jing (James) Lo. And Christiann Steenbergen as inventors and filed Feb. 28, 2003.

Ohkubo, S. et al. "*Optimization of Write Strategy in a PRML System for High Density Recording*" International Symposium on Optical Memory and Optical Data Storage Topical Meeting, Jul. 7-11, 2002, pp. 425-427.

\* cited by examiner

METHOD AND SYSTEM FOR SETTING OPTICAL DRIVE WRITE SPEED

BACKGROUND OF THE INVENTION

1. Field of the Invention

The present invention relates in general to the field of information handling system optical drive operation, and more particularly to a method and system for setting optical drive write speed for writing information to optical media.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have proliferated, so has the amount of information handled and stored by information handling system users. One increasingly used option for storing these greater amounts of information is optical media. Optical disc drives write information to optical media with lasers that illuminate an optical medium to selectively alter the reflective qualities of the optical medium, and read the information by illuminating the optical medium with the laser at a lower power to measure the reflection from the optical medium. Typically, each optical drive writes to different types of optical media with write strategies developed by the optical drive manufacturer. As optical media manufacturers produce improved optical media, such as optical media that will accept information at greater optical drive write speeds, optical drive manufacturers update the firmware of the optical drives to have write strategies developed for the improved optical media. For instance, a CD-RW optical drive reads embedded ATIP start codes from CD-R optical discs to uniquely identify the CD-R medium. The optical drive then writes information to the medium using a write strategy associated with the ATIP start code that the optical drive has in a table in firmware. A standards body known as the Orange Forum assigns codes to CD-R and CD-RW optical media manufacturers each time a new optical medium is released so that optical drive manufacturers can develop optimal write speeds and strategies for use with the medium and store the developed write speed and strategy in firmware. Other optical media, such as DVD media, have or may have similar implementations of such identification codes, either through assignment by a standards body or self-administered.

One difficulty that arises with the use of embedded codes on optical media to identify the media for optical drives is that an optical drive may read an embedded code from an inserted optical medium that the optical drive does not recognize. If the embedded identification code of an optical medium is not found in an optical drive's firmware, the optical drive typically reverts to a generic write strategy and write speed. Generally, optical drives slow the write speed for the generic write strategy to a value at which an acceptable quality write of information results regardless of the optical medium. However, the write speeds of optical drives and optical media tend to increase over time so that the use of a slow write speed with an unrecognized embedded code generally is an overly conservative approach. For instance, CD-R and CD-RW optical drive manufacturers typically load a current ATIP start table in firmware of optical drives at manufacture but do not typically update the firmware after manufacture. Thus, an optical drive installed in an information handling system may fail to recognize ATIP start codes of optical media released after manufacture of the optical drive, resulting in writes at slower speeds with generic write strategies even though newly developed optical media are typically designed to write at higher speeds. One solution is to compare an unrecognized ATIP start code with known codes, such as the last two digits of an ATIP start code. The write strategy for the closest known code is used to write information to the medium having the unknown code. However, use of write strategies of numerically close codes is unreliable and often little more than a guess that a proximately numbered optical media has similar write characteristics to an unknown optical media.

SUMMARY OF THE INVENTION

Therefore a need has arisen for a method and system which identifies optical media sufficiently for an optical disc drive to associate a write strategy with the optical media even though the optical media is released after the optical drive.

In accordance with the present invention, a method and system are provided which substantially reduce the disadvantages and problems associated with previous methods and systems for writing information from an optical disc drive to an optical medium released after the optical disc drive. Optical medium identification codes are preassigned to planned optical media, such as through an assigning standards body or through a parameter set that includes release date, and made available for loading onto optical disc drives. Optical disc drives manufactured before the development of write strategies for the planned optical media associate the preassigned identification codes with general write strategies that are based on design parameters of the planned optical media, such as the most recent precursor of the medium available to the drive manufacturer. Preassignment of identification codes to optical media improves write speed of optical drives that write to optical media released after manufacture of the optical drive since the optical drives since the optical drives default to a slow speed generic write strategy if an identification code is unknown.

More specifically, a manufacturer loads a manufactured optical disc drive with preassigned optical media identification codes and associates the preassigned identification codes with general write strategies. The general write strategies are developed from manufacturer design parameters so that a planned optical media identified by a preassigned code will have a general write strategy that allows writing at a greater write speed than is allowed by the optical disc drive's more conservative catch-all generic write strategy. For instance, optical medium identification codes are preassigned by optical media manufacturer so that a disc drive may use the write strategies of existing optical media of a manufacturer as a base point for planned optical media of that manufacturer. In one embodiment, the identification code has a common number for a given set of related optical media and ends with a date stamp that identifies the version of the optical media by its release date. A write strategy module of the optical disc drive reads the identification code from an inserted optical medium and determines if the identification code is associated with an assigned, preassigned or unknown optical medium. If the identification code is assigned or preassigned so that it has an associated write strategy, then that write strategy is used to write information to the optical medium. If the identification code is unknown, then a catch-all generic write strategy is applied to write the information.

The present invention provides a number of important technical advantages. One example of an important technical advantage is that an optical disc drive identifies optical media sufficiently to associate a write strategy with the optical media even though the optical media is released after the optical drive. Preassigned optical media identification codes allow development of general write strategies for planned optical media so that optical disc drives released before the development of a write strategy for an optical medium are able to write at greater speeds than otherwise supported by a conservative catch-all generic write strategy. The ability to write at greater speeds to newly released media with existing optical drives reduces the perception by users that the optical drive is malfunctioning and thus increases user satisfaction with reduced service calls and returns of optical drives.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An optical disc drive stores information generated by an information handling system onto an optical medium for which the disc drive lacked a write strategy at its manufacture by recognizing an identification code of the optical medium as a preassigned identification code. Information from the information handling system is written to the optical medium with a general write strategy associated with the preassigned identification code and developed based on design parameters of an optical medium planned at the time of manufacture of the disc drive. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
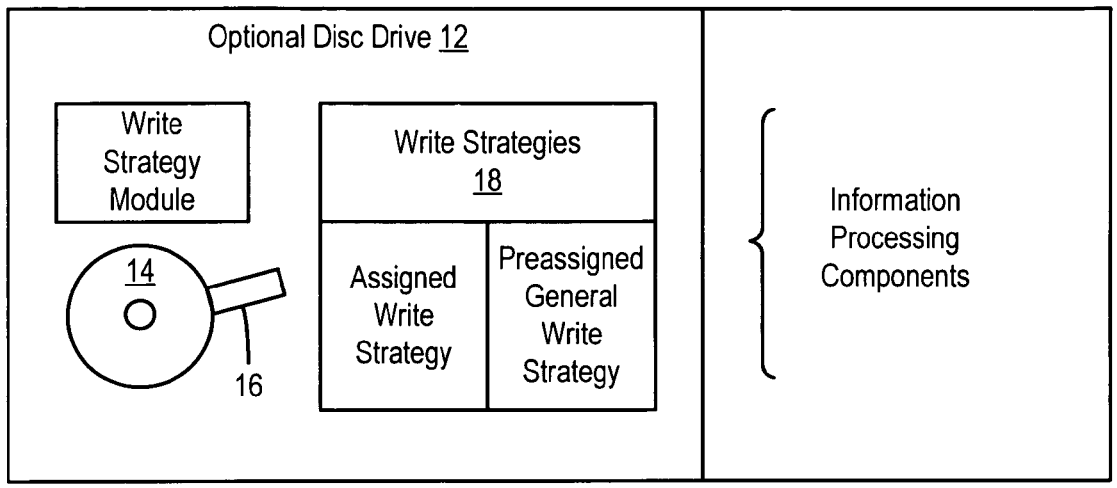
FIG. 1 depicts a block diagram of an information handling system having an optical drive that writes information to optical media based on preassigned identification codes.

Referring now to FIG. 1, a block diagram depicts an information handling system 10 having an optical disc drive 12 that writes information to an optical medium 14 with a write strategy associated with a preassigned optical medium identification code. Information processing components associated with information handling system 10 generate information for storage and communicate the information to optical disc drive 12. Optical disc drive 12 prepares to write the information to optical medium 14 by reading an optical medium identification from optical medium 14 with a laser 16. For instance, an ATIP start code issued by the Orange Forum for CD-R optical media is read from an inner diameter area. Other types of writable optical media, such as CD+RW, DVD-R, DVD-RW and DVD+RW optical media, may be identified with similar codes embedded in the optical media at manufacture. The read optical medium identification code is compared with codes listed in a write strategy table 18 to determine a write strategy for writing the information to the optical medium.

Write strategy table 18 is stored in memory associated with optical disc drive 12, such as the firmware of optical disc drive 12 or memory of the information processing components that is accessible by firmware. Write strategy table 18 is populated at manufacture of optical disc drive 12 with the write strategies developed by the manufacturer for known and tested optical media. For instance, the optical disc drive manufacturer tests each of the different types of optical media available to determine a write strategy settings for power, speed, and pulse characteristics, like pulse length, duration, delay and shape, that writes information with a desired accuracy on each optical medium. The optical disc drive manufacturer associates a write strategy with each type of optical medium's unique identification code. These write strategies are stored as assigned write strategies since each identification code is assigned to a particular optical medium type of an optical medium manufacturer.

Write strategy table 18 is also populated at manufacture of optical disc drive 12 with generic and general write strategies for use where an optical medium 14 has an unknown identification code or an identification code for which the optical disc drive manufacturer has not developed an associated write strategy. The generic write strategy writes information at a conservative speed setting in order to allow optical disc drive 12 to write information on virtually any optical medium having an unknown identification code with acceptable quality. Although this conservative generic write strategy ensures accurate writing of information on less advanced optical medium designed for use at lower writing speeds, its use on newly developed optical media designed for use at higher writing speeds needlessly slows the writing of information by optical disc drive 12. For instance, an information handling system user who puts a new optical medium into a new optical disc drive expects the drive to write at or near its maximum speed. However, if the optical disc drive manufacturer did not have a write strategy for the new optical medium at the manufacture of the optical disc drive, then use of the generic write strategy available for unknown optical media will result in a slow write speed and create a perception of improper performance to the user.

In order to prevent unnecessary reliance on the conservatively slow generic write strategy available for use with unknown optical media, optical medium identification codes are preassigned for planned optical media and stored in write strategy table 18. For instance, each optical media manufacturer is preassigned optical medium identification codes for optical media planned for development by that manufacturer, even if the media manufacturer has not begun any development work. The manufacturer provides optical disc drive manufacturers with design parameters for the planned optical medium, such as planned write speeds or the planned optical medium's relationship to existing optical medium of the manufacturer. The optical disc drive manufacturer is then able to develop general write strategies for the planned optical media and associate the general write strategies with the preassigned optical medium identification codes stored in write strategy table 18. Thus, optical disc drive 12 receives an optical medium that was developed after manufacture of the optical disc drive and applies a generic write strategy to write information to the optical medium by reading the identification code from the optical medium, matching the read identification code to a preassigned identification code of write strategy table 18, and using the general write strategy associated with the preassigned identification code. The optical disc manufacturer prepares general write strategies based on the backwards compatibility of newer media and a look at existing related media to find the closest fit to a planned medium. In one embodiment, related media have the same identification code except for a time stamp added at the end of the identification code that specifies the version of the media. In such an embodiment, information is written to an optical medium by an assigned write strategy if the complete identification code is present in the write strategy table and is written with a general write strategy if the version time stamp is not present with the general write strategy selected by the portion of the identification code that precedes the time stamp.

Figure 1A:
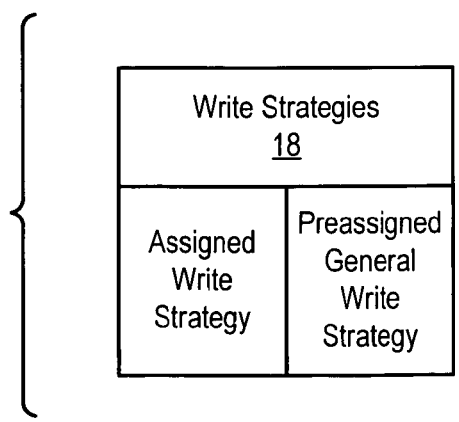

Referring now to FIG. 1A, the use of preassigned optical media identification codes for a manufacturer of an optical media is illustrated in an example of an optical disc drive write strategy table 18 for a CD-R or CD-RW drive. Three part ATIP start codes are associated with assigned and future planned optical media. For each ATIP start code, the optical drive write strategy table has a write strategy including a write speed. The ATIP start codes that are assigned to an existing optical medium of the manufacturer have a corresponding entry in write strategy table 18 with a write strategy developed by the optical disc drive manufacturer for that optical medium. The ATIP start codes that are preassigned to future planned optical media have a corresponding entry in write strategy table 18 of a general write strategy prepared by the optical disc drive manufacturer based on an analysis of the design parameters of the future optical media. For instance, the optical disc drive manufacturer may use the write strategy of an optical medium having similar design parameters or may simply use the generic write strategy with a higher write speed. Alternatively, if the identification code uses the time stamp implementation, the optical disc drive manufacturer implements an algorithm that finds a version of the optical medium by reference to the time stamp portion of the identification code that has an assigned write strategy and uses the assigned write strategy as the general write strategy. The write strategy for preassigned optical medium identification codes will select the lower of the planned maximum write speed of the optical medium or the maximum write speed of the optical disc drive.

Figure 2:
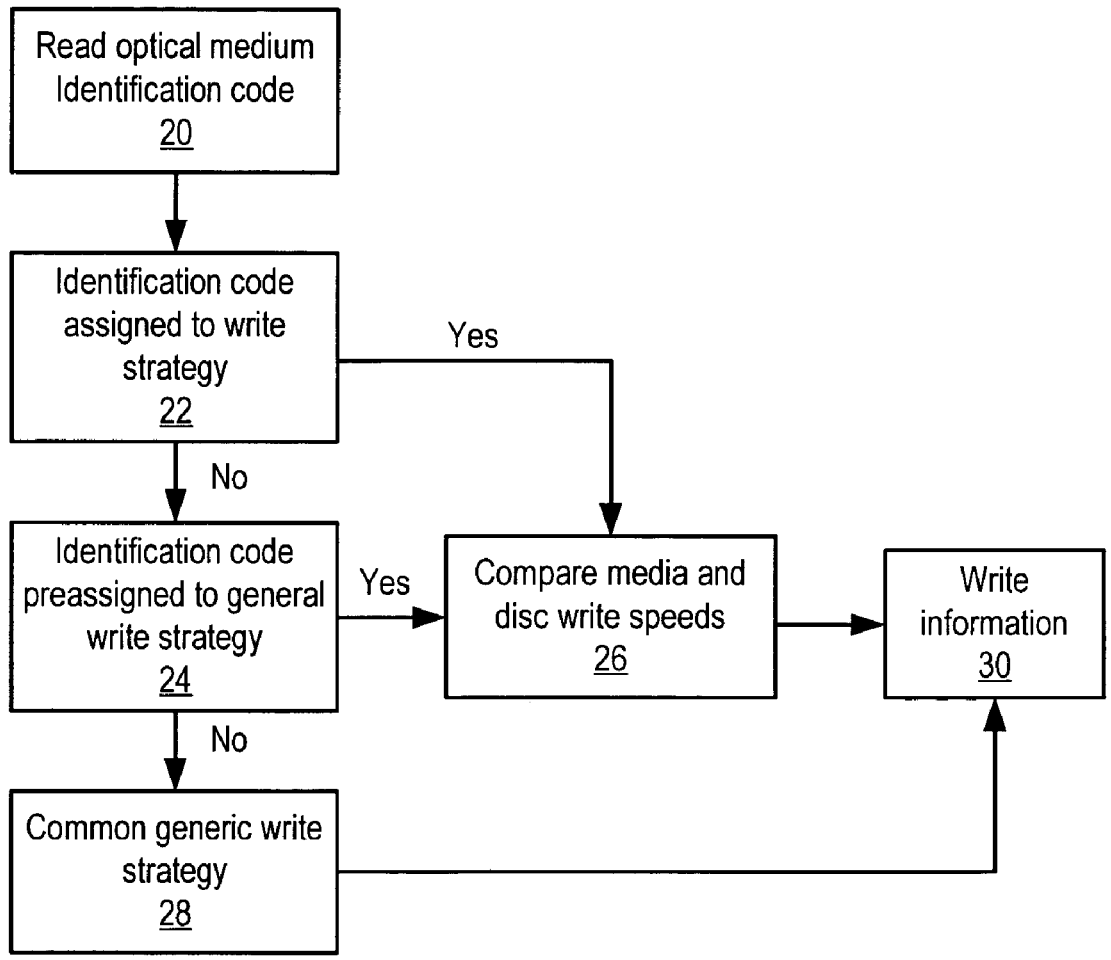
FIG. 2 depicts a flow diagram of a method for writing information with preassigned optical media identification codes.

Referring now to FIG. 2, a flow diagram depicts a method for writing information to an optical medium with a write strategy associated with a preassigned optical medium identification code. The process begins at step 20 with the reading of the optical medium identification code from the optical medium by the optical disc drive. At step 22, the read identification code is compared with the identification codes of the write strategy table to determine if the identification code is associated with an optical medium. For instance, a determination is made of whether an identification code is in the write strategy table that matches the time stamp of the read identification code. If no, the process continues to step 24 to compare the read identification code with the identification codes of the write strategy table to determine if the identification code is preassigned to a planned optical medium. For instance, a determination is made of whether a match exists in the write strategy table for the first portion of the identification code but not the time stamp. If a match exists on the first portion, the assigned write strategy for that identification code portion with the most recent date stamp is selected as the general write strategy. If the result of steps 22 or 24 are yes, the process continues to step 26 to compare the write speed of the optical medium with the maximum write speed of the optical disc drive so that the write speed of the write strategy will not exceed the maximum write speed of the optical disc drive. A result of yes at step 22 selects the write strategy from the write strategy table that is associated with the optical medium assigned to the read identification code. A result of yes at step 24 selects the general write strategy from the write strategy table that is associated with the planned optical medium preassigned to the read identification code. If the result at step 24 is no, the process continues to step 28 for selection of the common generic write strategy. Selection of the common generic write strategy indicates, for instance, that the read identification code is from an unknown optical media manufacturer.

Although the present invention has been described in detail, it should be understood that various changes, substitutions and alterations can be made hereto without departing from the spirit and scope of the invention as defined by the appended claims.

What is claimed is:

1. An information handling system comprising:
   information processing components operable to generate information for storage;
   an optical drive interfaced with the processing components and operable to accept the information for storage and to write the information to an optical medium according to a write strategy having a write speed;
   a write strategy table stored on the optical drive and having plural optical medium identification codes, each optical medium identification code having an associated write strategy;
   a general write strategy table stored on the optical drive and having plural preassigned optical medium identification codes, each preassigned optical medium identification code associated with one of plural general write strategies, each preassigned optical medium identification code associated with an optical medium planned for development by an optical medium manufacturer;
   a write strategy module operable to read an optical medium identification code from an optical medium and to provide the optical drive with the associated write strategy, the write strategy module further operable to read a preassigned optical medium identification code and to provide the optical drive with the associated general write strategy.

2. The information handling system of claim 1 further comprising a generic write strategy associated with unknown optical medium identification codes, wherein the write strategy module is further operable to read an unknown optical medium identification code and to provide the optical drive with the generic write strategy associated with unknown identification codes.

3. The information handling system of claim 1 wherein each preassigned optical medium identification code is preassigned by optical media manufacturer and associated with a write strategy for writing information with the optical disc drive to an optical medium of the optical media manufacturer.

4. The information handling system of claim 3 wherein each preassigned optical medium identification code is associated with an optical medium identification code of the write strategy table.

5. The information handling system of claim 3 wherein each preassigned optical medium identification code general write strategy comprises a write speed and wherein the optical drive writes the information at the lesser of the write speed or the maximum speed of the optical drive.

6. The information handling system of claim 1 wherein the optical medium identification codes comprise ATIP start codes.

7. The information handling system of claim 1 wherein the optical disc drive comprises a DVD disc drive.

8. A method for writing information to an optical medium from an optical disc drive, the method comprising:
    associating optical medium identification codes with optical media having write strategies for writing information from the optical disc drive to the optical media, each write strategy having plural write parameters;
    preassigning optical medium identification codes for optical media lacking write strategies for writing information from the optical disc drive to the optical medium, each preassigned optical medium identification code associated with an optical medium planned for development by an optical medium manufacturer;
    associating general write strategies with the preassigned optical medium identification code, the general write strategies having one or more parameters of write strategies associated with an optical media having a write strategy; and
    storing the optical medium identification codes and write strategies on the optical disc drive for access by the optical disc drive to write information to optical media.

9. The method of claim 8 further comprising associating a generic write strategy with unknown optical medium lacking an assigned or preassigned optical medium identification code.

10. The method of claim 9 further comprising:
    reading an optical medium identification code from an optical medium with the optical disc;
    determining that the optical medium identification code is a preassigned optical medium identification code; and
    writing information to the optical medium with the general write strategy associated with the preassigned optical medium identification code.

11. The method of claim 10 wherein the general write strategy parameters comprise write speed, the method further comprising:
    comparing the general write speed with the optical drive maximum write speed; and
    writing the information at the lesser of the general write speed and the optical drive maximum write speed.

12. The method of claim 8 wherein preasssigning optical medium identification codes further comprises:
    preassigning optical medium identification codes by optical media manufacturer; and
    associating one or more write strategy parameters with a preassigned optical medium identification code according to a time stamp appended to the identification code.

13. The method of claim 8 wherein the write strategy parameter comprises write speed.

14. The method of claim 8 wherein the optical medium identification code comprises an ATIP start code.

15. A method for configuring an optical disc drive to write information to optical media, the method comprising:
    preassigning optical medium identification codes to optical media manufacturers, each preassigned optical medium identification code associated with an optical medium planned for development by an optical medium manufacturer;
    associating design parameters of a planned optical media with the preassigned optical medium identification codes;
    communicating the preassigned optical medium identification codes and associated design parameters to optical disc drive manufacturers;
    building optical disc drives to recognize the preassigned optical medium identification codes and write information with a write strategy defined according to the design parameters;
    releasing optical media having the preassigned optical medium identification codes; and
    writing information from an optical disc drive to the released optical media with the general write strategy associated with the preassigned optical medium identification code.

16. The method of claim 15 wherein the design parameter comprises optical disc drive write speed.

17. The method of claim 15 wherein the design parameters comprise similarities with one or more existing optical medium of the manufacturer.

18. An optical disc drive comprising:
    a write strategy table stored in memory on the optical disc drive, the write strategy table having plural optical medium identification codes, each optical medium identification code having an associated write strategy; and
    a write strategy module operable to read an optical medium identification code from an optical medium and select the write strategy associated with the identification code from the write strategy table for writing information to the optical medium;
    wherein at least one optical medium identification code stored in memory on the optical disc drive comprises a preassigned optical medium identification code associated with an optical medium planned for development at the time of manufacture of the optical disc drive, the planned optical medium having design parameters, the write strategy associated with the preassigned optical medium identification code providing for writes according to the design parameters.

19. The optical disc drive of claim 18 wherein the design parameters comprise write speed for writing information to the optical medium.

20. The optical disc drive of claim 18 wherein the preassigned optical medium identification code is preassigned by optical medium manufacturer and wherein the design parameters relate to an existing optical medium of the optical medium manufacturer.

* * * * *